(12) United States Patent
Reminder

(10) Patent No.: US 12,391,474 B2
(45) Date of Patent: Aug. 19, 2025

(54) STORAGE RACK FOR THE STORAGE OF LONG GOODS

(71) Applicant: Hänel GmbH & Co. KG, Bad Friedrichshall (DE)

(72) Inventor: Manfred Reminder, Ingelfingen (DE)

(73) Assignee: Hanel GmbH & Co. KG, Bad Friedrichshall (DE)

( * ) Notice: Subject to any disclaimer, the term of this patent is extended or adjusted under 35 U.S.C. 154(b) by 0 days.

(21) Appl. No.: 17/920,886

(22) PCT Filed: Apr. 16, 2021

(86) PCT No.: PCT/EP2021/059965
§ 371 (c)(1),
(2) Date: Oct. 24, 2022

(87) PCT Pub. No.: WO2021/213932
PCT Pub. Date: Oct. 28, 2021

(65) Prior Publication Data
US 2023/0257197 A1    Aug. 17, 2023

(30) Foreign Application Priority Data
Apr. 23, 2020 (DE) .......... 102020111076.6

(51) Int. Cl.
*B65G 1/04* (2006.01)
*B65G 1/127* (2006.01)

(52) U.S. Cl.
CPC .......... *B65G 1/0442* (2013.01); *B65G 1/127* (2013.01); *B65G 2201/0217* (2013.01)

(58) Field of Classification Search
CPC .......... B65G 1/0442; B65G 1/10; B65G 1/04; B65G 1/127; B65G 2201/0217
See application file for complete search history.

(56) References Cited

U.S. PATENT DOCUMENTS

| 2,704,614 | A | * | 3/1955 | St. John et al. | .......... | A21B 3/18 414/415 |
| 3,926,299 | A | * | 12/1975 | Bradley | ................ | B65G 65/00 414/800 |
| 4,801,236 | A | * | 1/1989 | Katzenschwanz | ..... | B65G 1/127 198/483.1 |

(Continued)

FOREIGN PATENT DOCUMENTS

| CN | 105501774 A | 4/2016 |
| DE | 102009033169 A1 | 1/2011 |

(Continued)

*Primary Examiner* — Patrick D Hawn
(74) *Attorney, Agent, or Firm* — Timothy W. Menasco, Esq.; Harter Secrest & Emery LLP

(57) ABSTRACT

The invention relates to a storage rack (10) for the storage of long goods (24), such as an aluminum profile or a gutter, having a housing (11), which is delimited by opposing side walls (12), for accommodating a plurality of trays (15) in which the long goods are accommodated, having a first service opening (16) disposed at an end face (13) of the housing (11), and having a transport device (14) for the automated transport of the trays (15). The storage rack (10) has a second service opening (17), wherein the second service opening (17) is disposed on the side wall (12) of the housing (11).

20 Claims, 3 Drawing Sheets

(56) References Cited

U.S. PATENT DOCUMENTS

| | | | | |
|---|---|---|---|---|
| 5,161,929 | A * | 11/1992 | Lichti, Sr. | B65G 1/1371 198/794 |
| 5,427,490 | A * | 6/1995 | Tokiwa | B65G 1/0442 414/280 |
| 6,024,425 | A * | 2/2000 | Imai | B65G 1/04 254/338 |
| 6,854,815 | B1 * | 2/2005 | Smith | A47B 49/008 211/121 |
| 7,648,321 | B2 * | 1/2010 | Neeper | G01N 35/00732 52/745.1 |
| 8,464,410 | B1 * | 6/2013 | Lyon | B65G 1/08 254/10 R |
| 9,242,810 | B2 * | 1/2016 | Lõssov | G06Q 10/08 |
| 10,301,112 | B2 * | 5/2019 | Stolzer | B65G 1/1378 |
| 10,322,877 | B2 * | 6/2019 | Belardinelli | B65G 1/12 |
| 10,457,483 | B2 * | 10/2019 | DeWitt | B65G 1/04 |
| 10,697,987 | B2 * | 6/2020 | Neeper | B65G 1/127 |
| 11,046,371 | B2 * | 6/2021 | Rosenfeld | B60R 9/06 |
| 11,479,409 | B2 * | 10/2022 | Hedley | B65G 1/127 |
| 11,479,413 | B2 * | 10/2022 | Must | B65D 88/74 |
| 11,572,230 | B2 * | 2/2023 | Nowinski | B65G 1/12 |
| 12,012,284 | B2 * | 6/2024 | Reminder | B65G 1/137 |
| 2006/0150659 | A1 * | 7/2006 | Sidor | F25D 13/06 62/378 |
| 2008/0122615 | A1 * | 5/2008 | Shoenfeld | G08B 13/14 700/218 |
| 2010/0307989 | A1 * | 12/2010 | Hanel | B65G 1/0407 211/79 |
| 2021/0380342 | A1 * | 12/2021 | Wright | G07F 9/105 |
| 2022/0324648 | A1 * | 10/2022 | Valinsky | B65G 1/10 |

FOREIGN PATENT DOCUMENTS

| | | | | |
|---|---|---|---|---|
| DE | 102009051193 | A1 | 5/2011 | |
| EP | 0722894 | A1 | 7/1996 | |
| EP | 2145842 | B1 * | 6/2012 | B65G 1/0485 |
| JP | S53102000 | U | 8/1978 | |
| JP | H08188207 | A | 7/1996 | |
| WO | 2011006601 | A1 | 1/2011 | |

* cited by examiner

STORAGE RACK FOR THE STORAGE OF LONG GOODS

The invention relates to a storage rack for the storage of long goods, such as an aluminum profile or a gutter, having a housing, which is delimited by opposing side walls, for accommodating a plurality of trays in which the long goods are accommodated, having a first service opening disposed at an end face of the housing, and having a transport device for the automated transport of the trays. The invention further relates to a stacking frame for such a storage rack.

Such storage racks are known and are provided as vertical lifts or vertical carousels. The storage rack has a housing on which a service opening is provided. The storage goods are deposited and retrieved by the warehouse clerk via the service opening. The storage goods are placed on a tray, which is then delivered by means of a transport device to a storage space provided in the housing of the storage rack. Such a vertical lift, which has two spaced-apart racks and a transport device located between them, is described in EP 0 722 894 A1.

The depositing of long goods, e.g. of aluminum profiles or gutters having a length of 3 to 5 m, via the service opening of the storage rack is often difficult for the warehouse clerk to carry out, because the length of the long goods may result in jamming in the service opening or on the tray. Damage to the storage goods may also result therefrom. Moreover, the targeted access to storage goods may result in storage goods that are not required being retrieved first.

The invention is based on the object of providing a storage rack of the type mentioned in the introduction, which enables a simple and ergonomic depositing of long goods.

In order to accomplish this object, a storage rack having the features of claim 1 and a stacking frame having the features of claim 11 are proposed.

Advantageous embodiments are the subject matter of the dependent claims 2 to 10.

In particular, the storage rack according to the invention is characterized in that the storage rack has a second service opening, wherein the second service opening is disposed on the side wall of the housing.

The second service opening enables the warehouse clerk to laterally access the tray, whereby he is able to insert and remove the long goods along the longitudinal direction. This is advantageous in that the long goods can be manually deposited by only a single warehouse clerk. Due to the delivery via the second service opening, jamming of the storage goods and resultant damage are avoided. Thus, it is possible to deposit and retrieve the long goods in a simple, targeted and ergonomic manner.

The second service opening may be disposed on the side wall in such a way that access to the tray on the work surface in the first service opening is made possible. Alternatively, the second service opening may be disposed in such a way that access to the tray located on the transport device is made possible.

The end face extends along a longitudinal direction of the storage rack. A transverse direction extends along the side wall. Usually, the storage rack has a larger extent in the longitudinal direction than in the transverse direction.

Advantageously, the storage rack has a plurality of storage spaces formed by carrier supports, which are located one above the other and spaced apart, and which are arranged in pairs at the opposing side walls of the housing for accommodating the trays, wherein the trays can be delivered to or retrieved from the storage spaces by means of the transport device. Such a storage rack is referred to as a vertical lift.

Accordingly, the surface above the first service opening may additionally be used for storing. Primarily, such a storage rack is characterized by the rapid storage and access times with a high storage density of, in particular, large-scale parts.

Alternatively, the storage rack may be configured as a vertical carousel having a circulating transport device. In this case, the storage goods are conveyed to the first service opening by means of a circulating movement of the transport device. Such vertical carousels are often also referred to as paternosters.

Advantageously, the storage rack has a stacking frame for accommodating the long goods, which is accommodated on the tray. The additional stacking frame is designed such that it can be placed on the tray. In this case, the base of the tray may be adapted to fit to an upwardly protruding side wall of the tray, so that the stacking frame rests positively on the tray. The stacking frame makes it possible that the storage goods do not roll or slide off the tray, particularly during transport by means of the transport device.

For this purpose, the stacking frame may have a lateral limiting bar, which protrudes vertically upwards. In an advantageous embodiment, the stacking frame has a plurality of lateral and opposite limiting bars. They may also have a stabilizing web connecting the limiting bars to one another, whereby the rigidity is increased.

In another advantageous embodiment, the stacking frame can be coupled to the tray. The coupling may comprise a detachable connection, such as a screw, a bolt, a tension lock for rapid connection, or another suitable means. Via the coupling, it is ensured that the stacking frame does not tip off the tray.

Advantageously, the stacking frame has supporting arms for supporting the long goods. Moreover, it is possible to store long goods in several layers within the stacking frame by means of supporting arms disposed one above the other. At the same time, the stacking frame thus has only a small weight and increases the storage density additionally. The supporting arms may be supported between two opposite lateral limiting bars.

Advantageously, the stacking frame has an insertion unit, in particular a roller, that supports the long goods. The depositing of the long goods on the stacking frame and their retrieval therefrom is thus facilitated. The insertion unit may include a roller or only a cover consisting of a material for protection against damage to the long goods, e.g. scratches. A plastic with high antifriction properties, such as polytetrafluoroethylene (Teflon) or polyoxymethylene (POM), for example, may be used as the material for the cover. Moreover, it is also possible to provide such an insertion unit on each supporting arm of the stacking frame. This facilitates a particularly effortless shifting of the storage goods that is gentle on the material.

Advantageously, the stacking frame has individual compartments. The individual compartments enable the individual removal of the long goods. In order to delimit the compartments, individual delimiting means may be provided, which are respectively attached to the supporting arms. Moreover, the long goods are not damaged by stacking the long goods.

Advantageously, the second service opening has an insertion unit supporting the storage goods during depositing and retrieving. The insertion unit may be formed by the lower edge of the service opening or by an additionally mounted means. The insertion unit makes it easier for the warehouse clerk to insert the long goods. The insertion unit may include one or several rollers or only a cover consisting of a material with good antifriction properties. A plastic, e.g. polytetrafluoroethylene (Teflon) or polyoxymethylene (POM), may be used as the material for the cover.

Advantageously, the second service opening can be closed by means of a closing device, in particular a roller shutter or a manually or automatically displaceable closing member. The closing device increases operational safety, because no lateral access is possible during normal operation. Accordingly, it is not possible to enter this area inadvertently.

Embodiments of the storage rack according to the invention and the stacking frame, which are schematically shown in the attached drawings, are described below. In the Figures.

Figure 1:
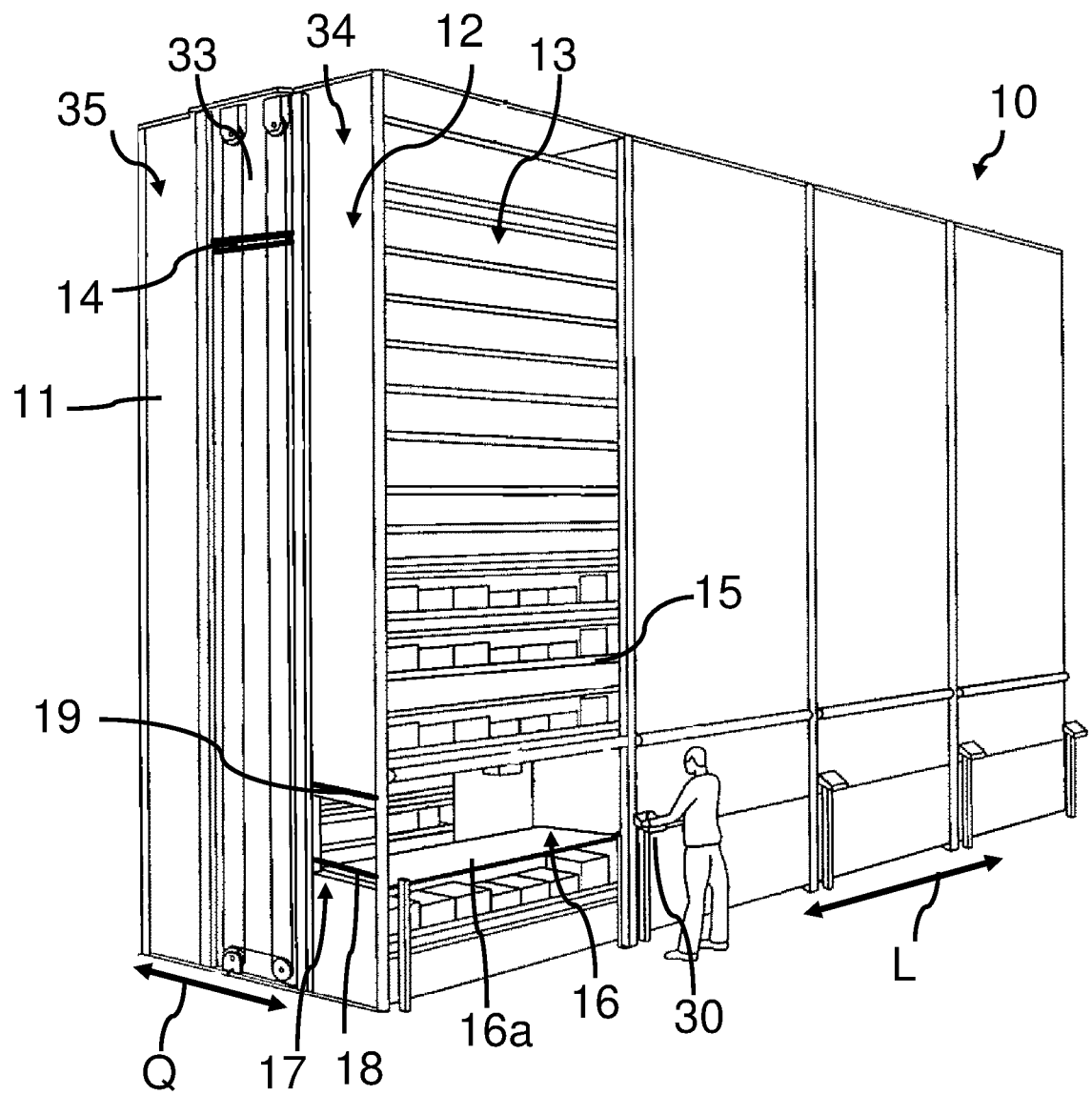
FIG. 1 shows a first embodiment of a storage rack according to the invention in a perspective view.

FIG. 1 shows a perspective view of a storage rack 10 for the storage of long goods 24, such as an aluminum profile or a gutter, which may have a length of about 2 to 5 m.

Figure 4:
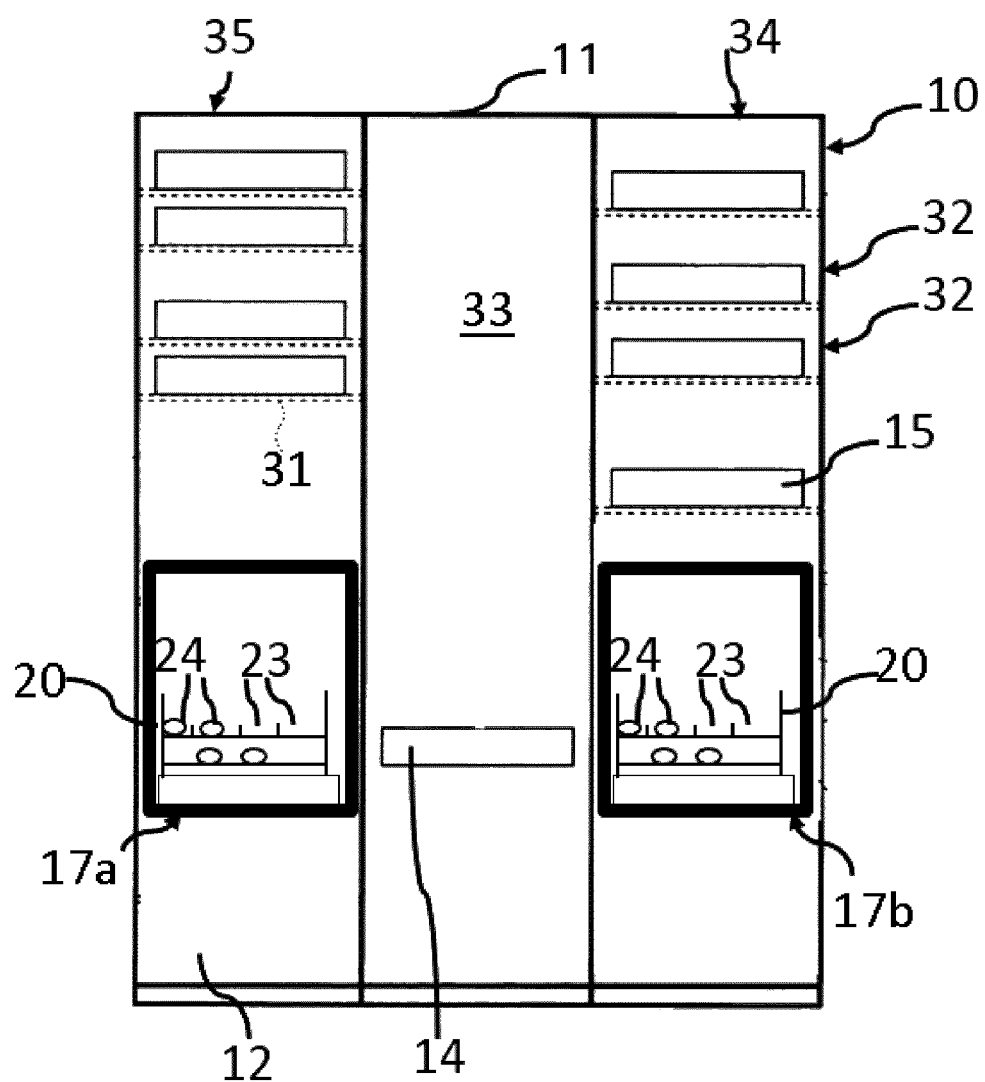
FIG. 4 shows a lateral view of a second embodiment of a storage rack according to the invention.

The storage rack 10, which is configured as a vertical lift, includes two racks 34, 35, which are arranged at a distance from each other and are each enclosed by a housing 11. The racks 34, 35 have side walls 12 that are oriented parallel to each other. As shown in FIG. 4, a plurality of storage spaces 32 with spaced-apart carrier supports 31 situated one above the other is arranged in each rack 34, 35. The storage spaces 32 are configured for accommodating trays 15 on which storage goods or long goods 24 are stored. A transport shaft 33, in which a transport device 14 can be moved upwards and downwards, is located between the racks 34, 35. Via the transport shaft 33, the controllable transport device 14 can place the trays 15 in the storage spaces 32 or remove them therefrom.

For the loading or removal of the stored goods 24 by a warehouse clerk, the storage rack 10 has a first service opening 16 and a second service opening 17. The latter are shown enlarged in FIG. 3.

The first service opening 16 is disposed at an end face 13 of the storage rack 10, which extends along a longitudinal direction L of the storage rack 10. The first service opening 16 has a work surface 16a on which the tray 15 can be inserted for loading and/or removal from the transport device 14. Then, the warehouse clerk can manually place storage goods in the tray 15 via the first service opening 16. The storage rack 10 may also have several first service openings 16. They may be arranged side-by-side and/or in each case on both sides of the opposing racks 34, 35.

The second service opening 17 is arranged on the side wall 12 of the storage rack 10 and extends along a transverse direction Q. A lateral access to the work surface 16a of the first service opening 16 is made possible via the second service opening 17.

The second service opening 17 has an insertion unit 18 supporting the long goods 24 during depositing and retrieving. Relative to the work surface 16a, the insertion unit 18 is arranged at a greater height. In FIG. 1, this insertion unit 18 is depicted as a roller, whereas the insertion unit 18 in FIG. 3 is shown as a cover of the lower edge of the second service opening 17.

Moreover, the second service opening 17 has a closing device 19 capable of closing the access to the work surface 16a. The closing device may be configured as a roller shutter.

Figure 2:
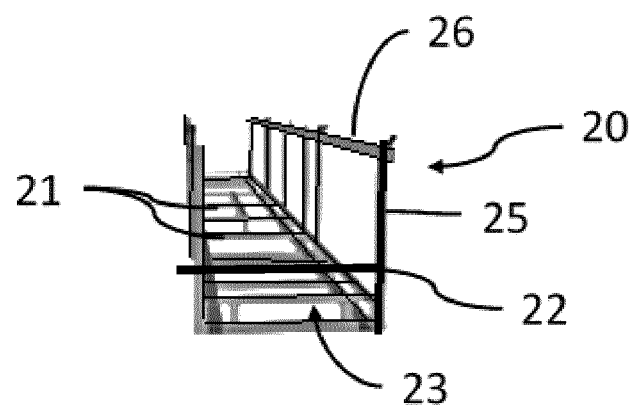
FIG. 2 shows a stacking frame for a storage rack according to FIG. 1.
Figure 3:
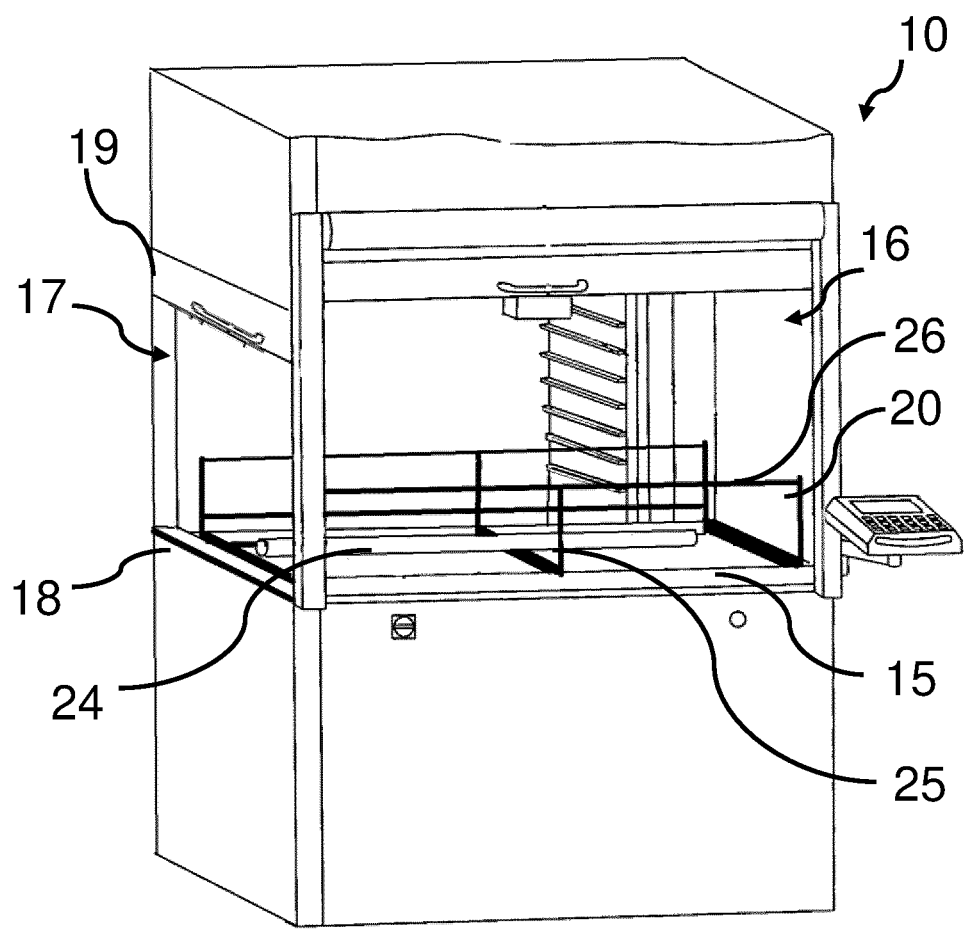
FIG. 3 shows a portion of the storage rack according to the invention in a perspective view.

As shown in FIGS. 3 and 4, a stacking frame 20 is disposed on the tray. The stacking frame 20 is shown separately in FIG. 2. It can be firmly connected to the tray 20 by means of a coupling device.

As shown in FIG. 2, the stacking frame 20 has longitudinally spaced-apart supporting arms 21 and lateral limiting bars 25, which form storage compartments 23 for long goods 24. The depicted limiting bars 25 are connected via a stabilizing web 26. As shown in FIG. 4, the supporting arm 21 may additionally be disposed one above the other. Furthermore, additional limiting bars 25, which form a plurality of compartments 23, may be disposed on the supporting arms 21. In order to facilitate the depositing and removing of long goods 24, the stacking frame 20 may have an insertion unit 22. The latter may be configured as a roller or merely include a cover consisting of a plastic material with good antifriction properties, such as PTFE or POM, for example. The cover may be applied to each of the supporting arms 21.

The storage rack 10 shown in FIG. 4 constitutes another possible configuration of the storage rack 10 shown in FIGS. 1 and 3. Identical or functionally identical components may have the same reference numerals.

In this embodiment of the storage rack 10, a second service opening 17a, 17b is allocated to each of the rack 34 and the rack 35. The former are separated by the transport shaft 33 and arranged side-by-side on the side wall 12.

Using the second service opening 17, the warehouse clerk is able to insert long goods 24 into the storage rack 10 or retrieve them from such a storage rack 10 in a particularly ergonomic manner. Damage to the long goods 24 is avoided since the long goods 24 are conveyed in their longitudinal direction. The stacking frame 20 facilitates an ordered placement of the long goods 24.

REFERENCE SIGNS LIST

10 Storage rack
11 Housing
12 Side wall
13 End face
14 Transport device
15 Tray
16 First service opening
16a Work surface
17 Second service opening
17a, 17b Second service opening
18 Insertion unit
19 Closing device
20 Stacking frame
21 Supporting arm
22 Insertion unit
23 Compartment
24 Long goods
25 Lateral limiting bar
26 Stabilizing web
30 Operating unit
31 Carrier support
32 Storage spaces
33 Transport shaft
34 Rack
35 Rack
L Longitudinal direction
Q Transverse direction

The invention claimed is:

1. A storage rack for the storage of long goods,
having a housing, which is delimited by opposing side walls, for accommodating a plurality of trays in which the long goods are accommodated,
having a first service opening disposed at an end face of the housing, and
having a transport device for the automated transport of the trays;
characterized in that the storage rack has a second service opening,
wherein the first service opening has a work surface on which a tray can be inserted for loading and/or removal from the transport device,
wherein the second service opening is disposed on the side wall of the housing and extends along a transverse direction, and
wherein a lateral access to the work surface of the first service opening is made possible via the second service opening.

2. The storage rack according to claim 1, characterized by a plurality of storage spaces formed by carrier supports, which are located one above the other and spaced apart, and which are arranged in pairs at the opposing side walls of the housing for accommodating the trays, wherein the trays can be delivered to or retrieved from the storage spaces by means of the transport device.

3. The storage rack according to claim 1, characterized in that the storage rack is configured as a vertical carousel having a circulating transport device.

4. The storage rack according to claim 1, characterized by a stacking frame for accommodating the long goods, which is accommodated on the tray.

5. The storage rack according to claim 4, characterized in that the stacking frame can be coupled to the tray.

6. The storage rack according to claim 4, characterized in that the stacking frame has supporting arms for supporting the long goods.

7. The storage rack according to claim 4, characterized in that the stacking frame has an insertion unit, on which the long goods are supported.

8. The storage rack according to claim 4, characterized in that the stacking frame has individual compartments.

9. The storage rack according to claim 4, characterized in that the second service opening has an insertion unit supporting the storage goods.

10. The storage rack according to claim 4, characterized in that the second service opening can be closed by means of a closing device.

11. A combination of a stacking frame and storage rack, the storage rack comprising a housing, which is delimited by opposing side walls, for accommodating a plurality of trays in which the long goods are accommodated, the longs goods having a length between about 2 and 5 meters;
a first service opening disposed at an end face of the housing;
a transport device for the automated transport of the trays; and
a second service opening, wherein the second service opening is disposed on the side wall of the housing and extends along transverse,
wherein the first service opening has a work surface on which a tray can be inserted for loading and/or removal from the transport device, and
wherein a lateral access to the work surface of the first service opening is made possible via the second service opening.

12. The combination stacking frame and storage rack according to claim 11, the storage rack comprising a plurality of storage spaces formed by carrier supports, which are located one above the other and spaced apart, and which are arranged in pairs at the opposing side walls of the housing for accommodating the trays, wherein the trays can be delivered to or retrieved from the storage spaces by means of the transport device.

13. The combination stacking frame and storage rack according to claim 11, wherein the storage rack is configured as a vertical carousel having a circulating transport device.

14. The combination stacking frame and storage rack according to claim 11, wherein the storage rack is for accommodating the long goods, which is accommodated on the tray.

15. The combination stacking frame and storage rack according to claim 14, wherein the stacking frame can be coupled to the tray.

16. The combination stacking frame and storage rack according to claim 14, wherein the stacking frame has supporting arms for supporting the long goods.

17. The combination stacking frame and storage rack according to claim 14, wherein the stacking frame has an insertion unit, in particular a roller, on which the long goods are supported.

18. The combination stacking frame and storage rack according to claim 14, wherein the stacking frame has individual compartments.

19. The combination stacking frame and storage rack according to claim 14, wherein the second service opening has an insertion unit supporting the storage goods.

20. The combination stacking frame and storage rack according to claim 14, wherein the second service opening can be closed by means of a closing device, in particular a roller shutter or a closing member.

* * * * *